Patented July 11, 1939

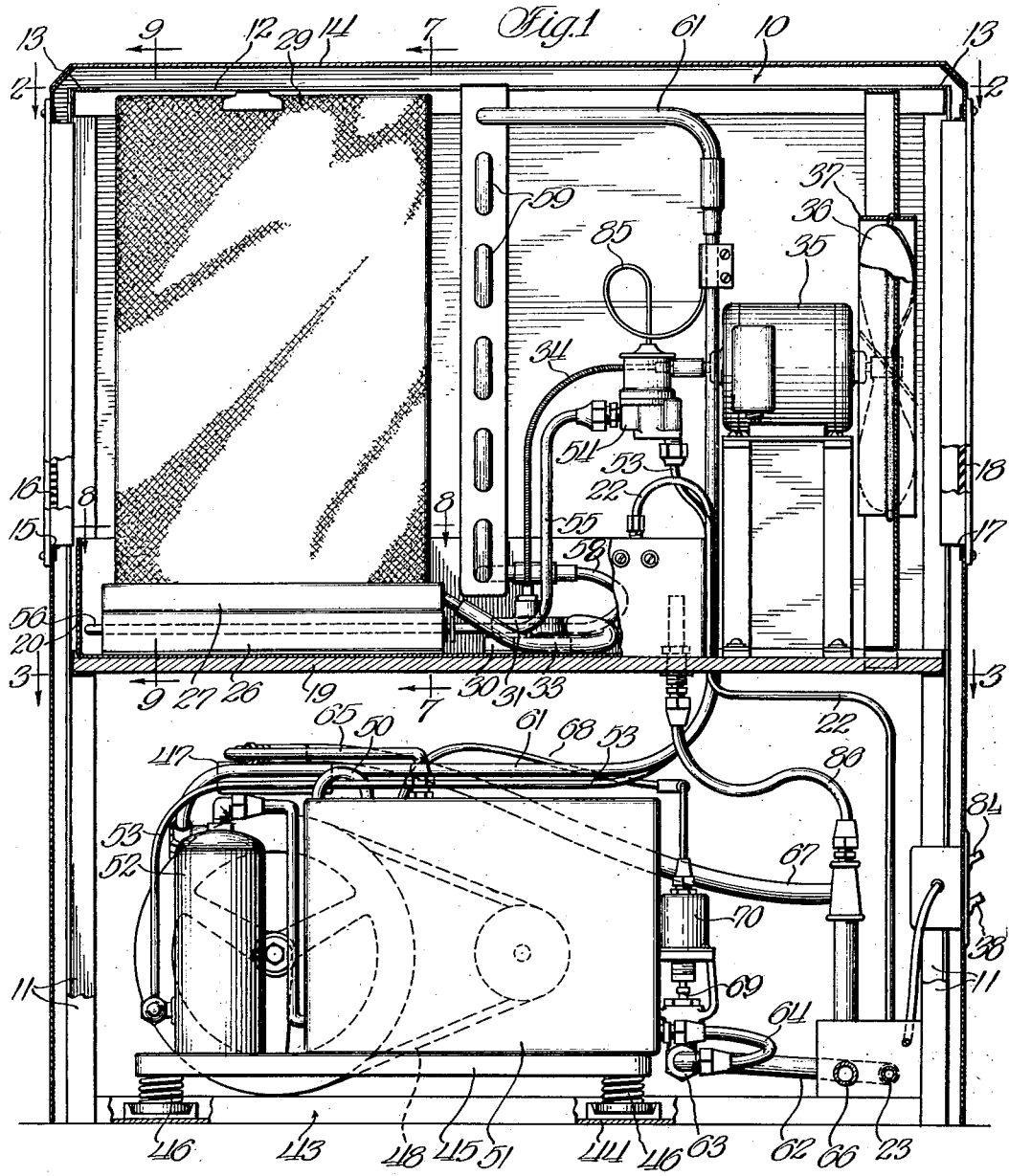

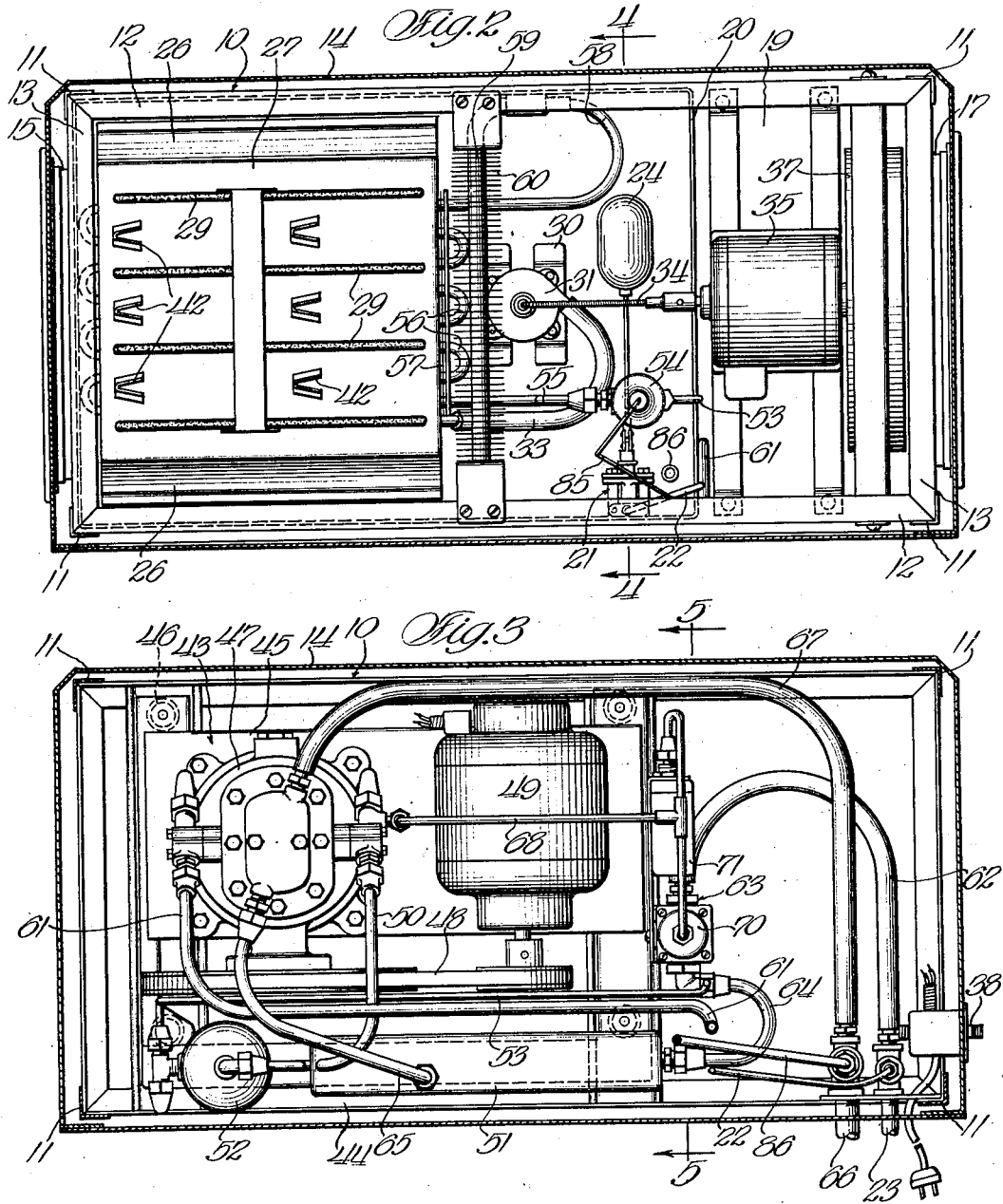

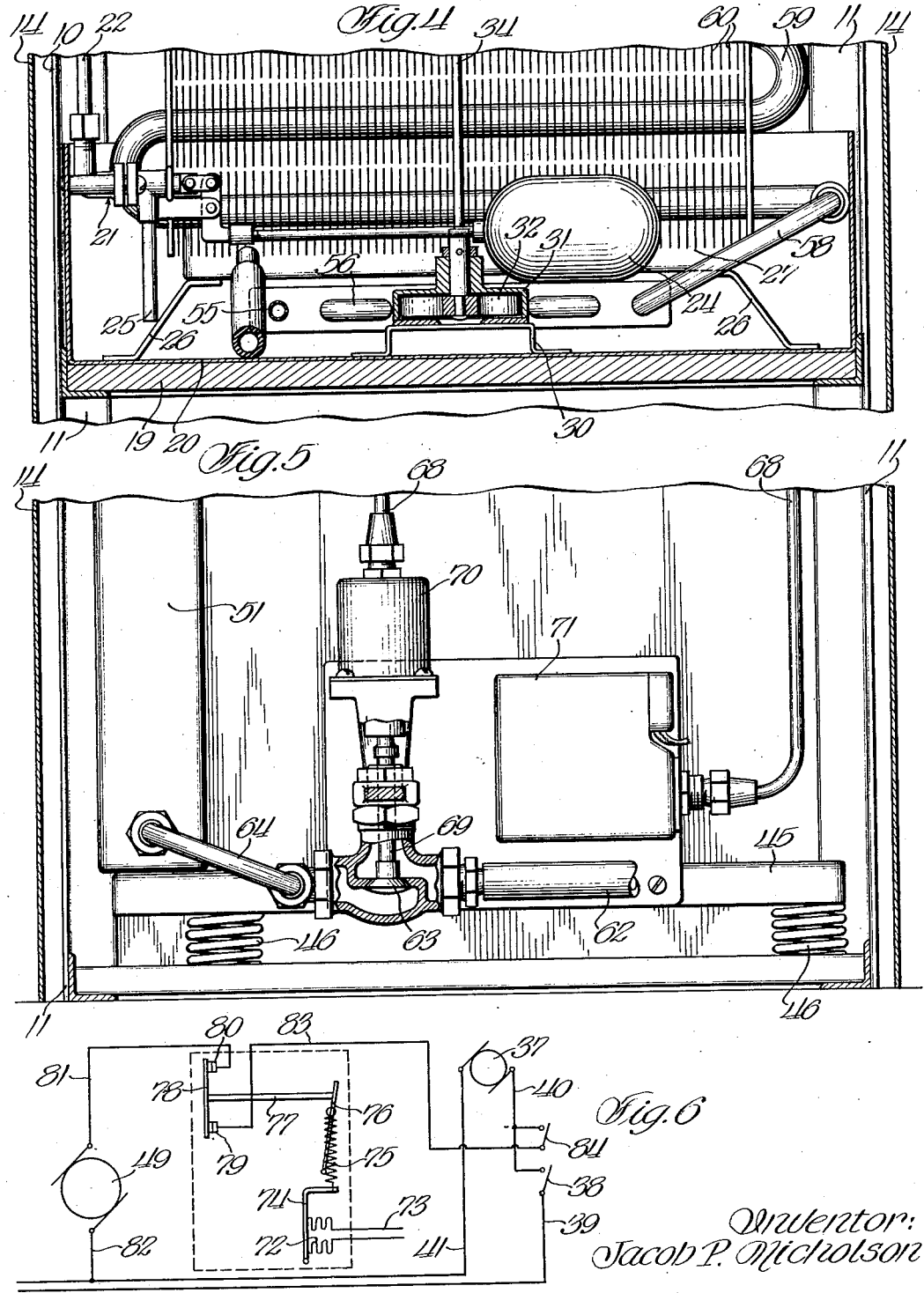

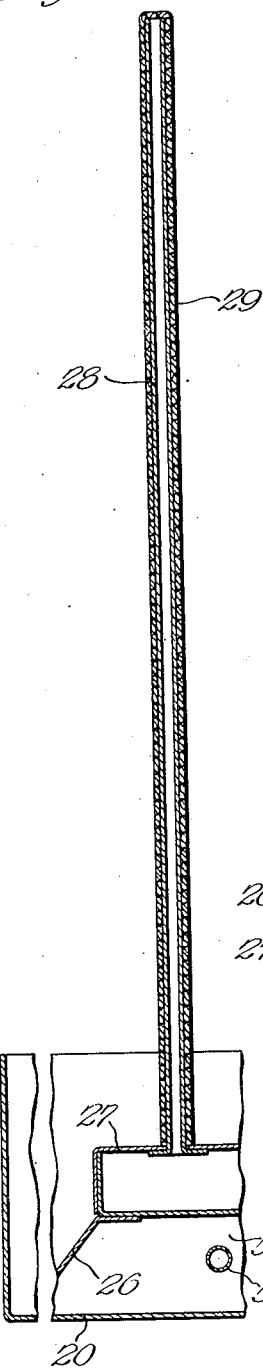
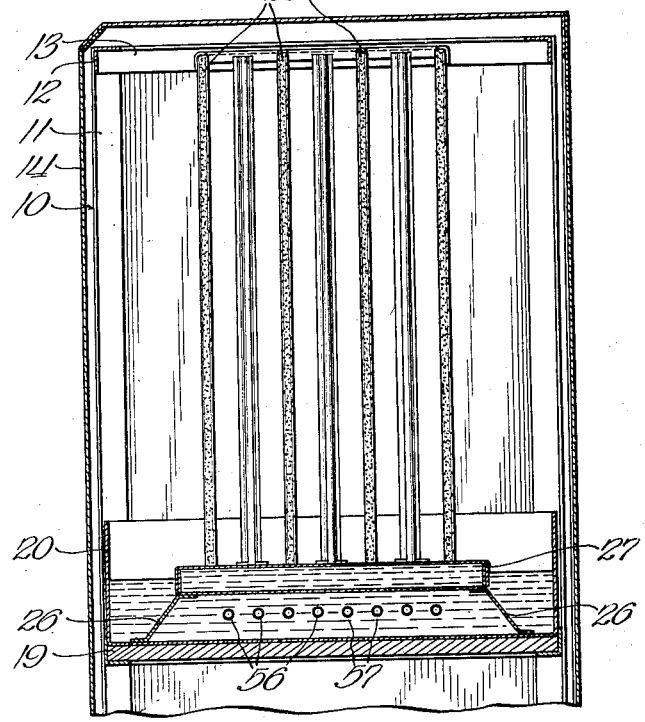
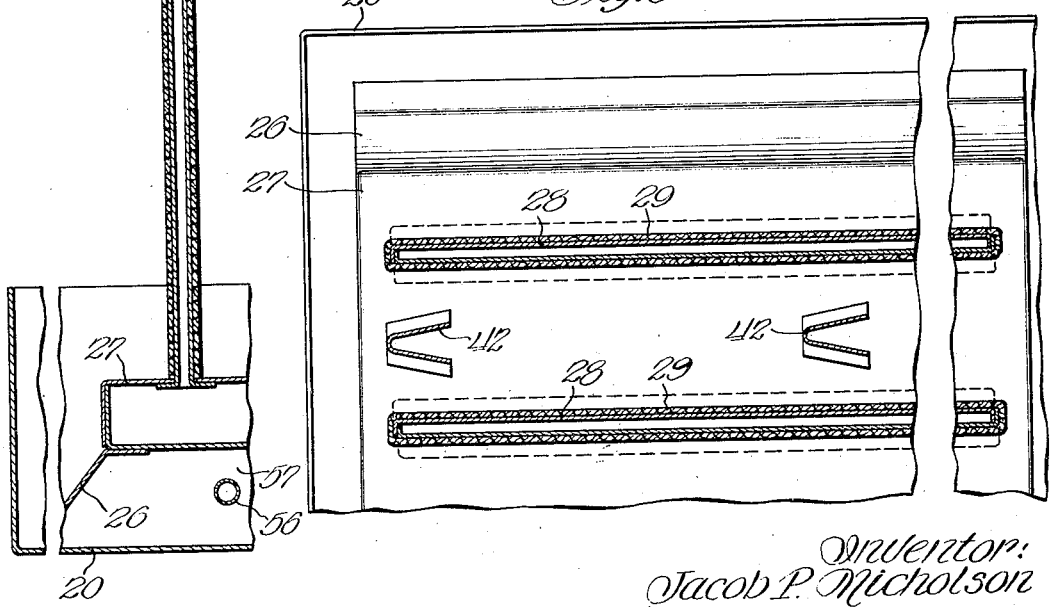

2,165,979

UNITED STATES PATENT OFFICE 2,165,979

AIR CONDITIONING APPARATUS

Jacob P. Nicholson, Chicago, Ill.

Application July 3, 1936, Serial No. 88,789

2 Claims. (Cl. 62—139)

My invention relates to air conditioning apparatus and more particularly to the type used for conditioning and recirculating the air confined in a predetermined space.

The important factors in air conditioning are air cleansing, circulation of the air without creating perceptible drafts, humidification of dry air in correct proportion to its temperature, dehumidification of air in correct proportion to its temperature where the air contains moisture in excess of that desired for human comfort, and the heat dissipation or temperature reduction of the air within the space serviced by the apparatus. Excepting air cleansing, however, these factors are not operative at the same time since humidification is generally characteristic of winter operation, while dehumidification and temperature reduction apply to summer conditions.

The present apparatus effectively meets the conditioning requirements of a predetermined space by establishing a correct balance or relationship between the conditioning elements of the apparatus and the space for which the apparatus is designed, although the principle involved in the apparatus is not restricted to units of any particular capacity, but may be applied to apparatus of increased or lower capacity than that hereinafter described. My improved apparatus handles equally well the varying air conditioning problems during the winter and summer months and is particularly useful for stores, shops, offices, homes, apartments, or any enclosure within the capacity of the unit designed therefor.

One object of my invention is to provide an air conditioning apparatus in which humidification of the air is achieved by a natural induction of moisture that will vary in proportion to the artificially produced temperature of the air in the space and will limit the moisture induction to a relative humidity consistent with health and comfort.

A further object is to provide an apparatus for conditioning air throughout the year which is so constructed and arranged that, during the winter months, the unit which performs such services as cleansing, humidifying and recirculating the air operates independently, and, during the summer months, in conjunction with the refrigeration unit performs the functions of cleansing, recirculating, dehumidifying, and temperature reduction.

A further object is to devise an apparatus of the character indicated which, through a simple washing action, removes from the air pollen, dust, and like impurities, and will also dissolve smoke and odor, and may also be utilized for dispensing medicaments, deodorants and disinfectants into the air.

A further object is to provide an air conditioning apparatus in which the conditioning is effected in a tunnel-like enclosure through which a predetermined volume of air is moved at a predetermined velocity in a confined stream, the inlet and outlet openings to the tunnel being spaced sufficiently to prevent interference between the incoming and outgoing air currents and to insure the widest possible circulation scope.

A further object is to devise an apparatus which includes a unit that dissipates sensible and latent heat of the treated air during summer operation and reverses this action by supplying to the air during the winter months a relative humidity that bears a correct relation to the temperature of the air in the space and which is desirable for health and comfort.

These and further objects of my invention will be set forth in the following specification, reference being had to the accompanying drawings, and the novel means by which said objects are effectuated will be definitely pointed out in the claims.

In the drawings:

Figure 1 is a sectional, side elevation of my improved air conditioning apparatus.

Fig. 2 is a plan section taken along the line 2—2 in Fig. 1, looking in the direction of the arrows, and showing the principal conditioning devices of the unit.

Fig. 3 is a section along the line 3—3 in Fig. 1, looking in the direction of the arrows, showing the refrigerating devices employed and the water connections.

Fig. 4 is an enlarged section along the line 4—4 in Fig. 2, looking in the direction of the arrows, showing the lower portion of the dehumidifying and cooling coil, the float-control valve which regulates the level of water in the reservoir, and the pump which provides for water circulation.

Fig. 5 is an enlarged section along the line 5—5 in Fig. 3, looking in the direction of the arrows, and showing the refrigerant controlled valve for regulating the flow of water to the condenser in the refrigerating system.

Fig. 6 is a diagram of the electrical connections employed.

Fig. 7 is a section along the line 7—7 in Fig. 1, looking in the direction of the arrows, showing the battery of fabric hooded tanks which compose the evaporating or humidifying and cleansing unit of the apparatus, and which also act as a cooling agent during summer operation.

Fig. 8 is an enlarged plan view, partly in section, of the left end of the apparatus, as viewed in Fig. 2, showing the shape of the water tanks and the deflectors or baffles which direct the air streams against the wet surfaces of the hooded tanks.

Fig. 9 is an enlarged section taken along the line 9—9 in Fig. 1, looking in the direction of the arrows, and showing the fabric hood which completely encloses each water tank.

Referring to the drawings, and more particularly to Fig. 1, the numeral 10 designates the skeleton frame of the apparatus which comprises uprights 11 which form the corners and which are interconnected at the top by length pieces 12 and cross pieces 13. A cabinet 14 which may be composed of any suitable material and suitably decorated, if desired, to blend with its surroundings, completely encloses the skeleton frame. This cabinet is generally in the form of a rectangular prism and at one end is provided with an inlet opening 15 and at the opposite end with an outlet opening 17 forming an air tunnel through which air is drawn and discharged, respectively, by devices hereinafter described. The inlet opening 15 is provided with a grill having a plurality of spaced vanes 16 extending thereacross and so arranged as to direct the air in a substantially horizontal stream into the interior of the cabinet. The outlet opening 17 is provided with a similar grill, but the vanes 18 thereof may be angularly inclined, as indicated in Fig. 1, to deflect the outgoing and conditioned air in a direction best suited for circulation of the air in the room or space serviced by the apparatus.

In describing the detailed features of the apparatus, it will be convenient to consider in order the winter and summer operative phases of the machine. During the winter months, heat is supplied to the room or space by independent heating means, such as steam, hot water, vapor, or hot air, so that air conditioning is essentially a problem of air cleansing, air recirculation, supplying moisture to the dry air and maintaining the relative humidity of the air at a point necessary for health and comfort.

Considering first the winter operation of the apparatus and referring to Fig. 1 of the drawings, a floor 19 is supported by the skeleton frame at a predetermined distance above the bottom of the uprights 11 and resting on this floor is an open top tank or reservoir 20. A float-actuated valve 21 is secured to the side wall of the reservoir 20 and this valve is connected by means of a pipe 22 with a water supply pipe 23 that extends outwardly of the cabinet 14 and is intended to be attached to any convenient source of water, such as city mains, wells and the like. Suitably connected to the valve is a float 24 for the purpose of insuring that a predetermined level of water is maintained in the reservoir 20. When the valve is opened by the float 24 dropping, water is discharged into the reservoir through a spout 25 forming a part of a valve.

A pair of angle brackets 26 are also rested on the bottom of the reservoir 20 and their opposite ends support a casing 27 in offset relation to the bottom of the reservoir. A plurality of tanks 28 extend upwardly from the casing 27, the lower end of each tank being open and in communication with the interior of the casing 27 and the upper end of each tank also being open (see Fig. 9). In plan view, each tank 28 is shaped generally as an elongated rectangle and the tanks are spaced from each other to provide elongated ducts therebetween through which the air is drawn as hereinafter described. As clearly indicated in Figs. 2 and 8, the tanks are arranged in parallel relation and completely covering each tank is a hood 29 of absorbent fabric which preferably is characterized by a roughened surface. Terry cloth has been found to work very satisfactorily for the purpose intended. This hood completely covers the sides and ends of each tank and including the open top thereof. The battery of tanks 28 functions as an evaporating and air washing or cleansing unit during the winter season and it will be noted that they are located relatively close to the inlet air opening 15 so that the incoming air is subjected almost immediately to the action of this unit.

Also resting on the bottom of the reservoir is a support 30 that carries a pump 31 within the casing of which is operable a turbine impeller 32. The height of the water in the reservoir 20 is such that the pump 31 is always completely submerged, the inlet of the pump being in communication with the reservoir, while a pipe 33 connects the discharge side of the pump with the casing 27. The impeller 32 is suspended within the pump casing on one end of a flexible shaft 34 whose opposite end is connected to the shaft of a motor 35. The opposite end of the motor shaft has fastened thereto a fan 36 which rotates within an open ended casing 37 located immediately adjacent the air outlet opening 17.

A manually operated, electric switch 38 is conveniently mounted on the cabinet and it is connected by a wire 39 (see Fig. 6) with any suitable source of electric power and also by a wire 40 with the motor 35. The opposite side of the motor 35 is in turn connected by a wire 41 to the same power source.

In describing the winter operation of the apparatus, it will be understood that the aforesaid electrical and water connections have been made and that water stands at the determined level in the reservoir 20. Accordingly, when the switch 38 is closed, the motor 35 is placed in operation, thus driving the fan 36 and the water pump 31.

The operation of the pump draws water from the reservoir and forces it upwardly through the individual tanks 28 until the water wells over the top edge of each tank and flows downwardly along the sides thereof, to completely soak the cloth or fabric hood 29. The capacity of the water pump is so arranged with respect to the absorbing quality of the fabric hoods that the latter are always maintained in a completely soaked condition, but the discharge of the pump is not so excessive as to set up a cascading of the water over the top edge of each tank 28. Drippings from each hood return to the reservoir 20.

The rotation of the fan 36 establishes a current of air through the tunnel formed by the apparatus enclosure from the inlet opening 15 to the outlet opening 17. After passing through the opening 15, the incoming air divides naturally and flows between and around the several tanks 28 and in order to insure an intimate wiping contact of the air with the wet fabric hoods, V-shaped baffles or deflectors 42 (see Figs. 2 and 8) are conveniently located between the opposing fabric faces of each adjacent pair of tanks.

During the winter season, since the air of the room or space serviced by the apparatus is independently heated by any suitable means, the temperature of the roof air will be considerably higher than that of the water entering the apparatus by way of the supply pipe 23. Accordingly, my improved apparatus provides a highly effective method, not only of supplying moisture generally to the air by its wiping contact with the wet fabric surfaces, but also of automatically establishing and maintaining within the space in question a relative humidity of the air at its particular temperature which is comfortable and healthful for the occupants thereof, as well as necessary to prevent drying out of articles within the space, such as furniture and the like.

The wet fabric hoods are an important feature of the apparatus because their absorptive action confines the water and prevents an excessive mechanical pick-up of water particles with a resulting condensation on windows and walls, such as might occur if the air were passed over an ordinary water surface. The tank 27 prevents any substantial contact of the air stream with the water in the reservoir.

The disclosed apparatus is designed to condition the air in a space from 4000 to 5000 cubic feet. Within this space limitation, the several parts have been so constructed, arranged and balanced that the air movement set up in the space by the apparatus will not cause any appreciable drafts that would otherwise cause discomfort. In other words, the circulation within the room is more or less imperceptible as far as the occupants are concerned.

In order to achieve the foregoing results, the evaporating area of the battery of tanks is preferably about 1550 square inches, while the air is moved through the apparatus at a velocity of about 600 feet per minute and at a quantitative rate of approximately 400 to 450 cubic feet per minute, thus providing substantially for five complete recirculating movements of the air per hour. The same numerical relationship between the wet surface area and air flow will hold for the design of higher capacity units. With such a balancing and arrangement of the humidifying and air moving elements, it is possible to establish and maintain within the space serviced by the machine a relative humidity of the air that is healthful and comfortable at the particular temperature of the air as established by independent means. For example, the apparatus will establish and automatically maintain a relative humidity range of from 30 per cent to 50 per cent corresponding approximately to an air temperature range of from 72 degrees Fahrenheit to 67 degrees Fahrenheit.

The air as it passes over the moistened fabric hoods is not only conditioned with respect to moisture absorption, but the soaking wet hoods also exert an effective washing action on the air, removing therefrom such impurities as pollen, dust, and other obnoxious elements and dissolving cigar and cigarette smoke, so that the air issuing from the apparatus is completely conditioned both as to moisture content and as to cleansing.

The purpose of inclining the grille vanes 18 in the air outlet opening 17 is to direct the conditioned air and assist in the natural circulation of air within the space. Preferably, these vanes are disposed at an angle of approximately 42 degrees to the horizontal. Other inclinations may be adopted as the conditions of operation may require, and the vanes may be disposed horizontally, inclined downwardly, or eliminated entirely.

Considering next the summer operation of the machine, the conditioning of the air at this time of the year is essentially one of cooling and condensing or dehumidifying the excess moisture from the air of the room occupied by the apparatus. Under such conditions, the battery of tanks with their hoods of absorbent fabric which, during winter operation, function as an evaporating and humidifying unit for moisture induction to the air, now acts in a contrary manner as a cooling unit to abstract sensible heat from the incoming and moisture-laden air and thereby reduce the dew point thereof.

Referring then to Figs. 1 to 3, inclusive, a refrigerating unit, designated generally by the numeral 43 is located within the cabinet and carried by a floor 44 which is disposed beneath the floor 19. It is contemplated, however, that this unit may be installed elsewhere than in the cabinet 14, such as in a closet, cellar, etc., so that the cabinet would then occupy less space in the room. A base plate 45 is cushioningly supported by a plurality of coil springs 46 on the floor 44 in order to absorb vibrations set up by a refrigerant compressor 47. This compressor may be of any well known construction and is driven either by a belt 48 that is connected to a motor 49 or, by direct drive. Refrigerant compressed in the compressor is delivered by a pipe 50 to a condenser 51 which may be of any well known construction and in passing through which the temperature of the refrigerant is reduced and the refrigerant condensed for flow into a receiver 52. The refrigerant employed is preferably methyl chloride and is compressed to a pressure of about 95 pounds per square inch. From the receiver 52, the liquid refrigerant passes through a pipe 53 to an expansion valve 54. The interior construction of this valve forms no part of my invention and it will be understood that in flowing therethrough, the refrigerant expands in the well known manner and then passes through a pipe 55 to a coil 56 that is submerged in the space between the bottom of the reservoir and the underside of the casing 27 (see Figs. 1, 2 and 7). The individual coils of this submerged refrigerating unit may be provided with a plurality of fins 57 in order to establish the required heat transfer area.

From the submerged coil 56, the refrigerant passes through a pipe 58 to a dehumidifying coil 59 that is generally transversely disposed to the direction of movement of the air through the apparatus and immediately adjacent the air discharge end of the battery of tanks 28. The coil 59 may also have its component parts provided with the usual fins 60. As the refrigerant leaves the top of the dehumidifying coil 59 it is generally in a gaseous state and it passes through a pipe 61 to the inlet side of the compressor 47, thus completing one cycle of movement of the refrigerant.

Water for the refrigerant condenser passes through a pipe 62 that is connected to the water supply pipe 23 and thence through a high pressure, refrigerant controlled valve 63 and a pipe 64 to the condenser. From the condenser the water passes through a pipe 65 to the water jackets of the compressor 47 and thence to the water outlet 66 by means of a pipe 67. The water outlet 66 may be suitably connected to a drain pipe.

The valve 63 provides an automatic control on the flow of water through the condenser as determined by the pressure on the high side of the compressor 47. As clearly shown in Fig. 3, a pipe 68 is interconnected between the high pressure side of the compressor and the valve 63. The internal construction of this valve forms no part of the present invention, but it will be understood that the valve stem 69 thereof is connected to a bellows (not shown) which is located within the cover 70 (see Fig. 5). As shown in Fig. 5, the valve 63 is closed to prevent any passage of water to the condenser, but when the pressure of the refrigerant rises sufficiently high, namely to a pressure above 95 pounds per square inch, the valve stem 69 will be moved downwardly to admit water to the condenser. The valve is adjusted to close at pressures of 95 pounds per square inch and below, so that water is intermittently supplied to the refrigerant condenser as an aid in the economical operation of the apparatus.

An automatic control on the operation of the motor 49 is also provided by a switch generally designated by the numeral 71 and which also includes a bellows represented diagrammatically by the numeral 72 in Fig. 6. This bellows communicates by a pipe 73 with the pipe 66 leading to the high side of the refrigerant compressor.

The internal construction of the switch 71 is diagrammatically illustrated in Fig. 6 and it will be seen that the bellows 72 contacts a pivoted arm 74. The free end of the arm 74 has attached thereto one end of a coil spring 75 whose opposite end is secured to a pivoted arm 76. The free end of the arm 76 bears against a stem 77 having a bridge 78 that engages a pair of contacts 79 and 80. The contact 80 is connected by a wire 81 with the compressor motor 49 which is in turn connected to the wire 41 by the wire 82. The contact 79 is connected by a wire 83 to one terminal of a switch 84 whose opposite terminal is connected to the wire 40. The purpose of this particular system of wiring will be presently described.

An automatic control is also provided on the flow of the refrigerant through the expansion valve 54 and this control is effected through the medium of a suitable tube 85 (see Fig. 1) which is closed at both ends and which contains a suitable expansible fluid. Tubes of this nature are quite common in the art of refrigerant control. One end of this tube is clamped to the return refrigerant pipe 61 so as to be effected by its temperature, while the opposite end of the tube extends within the casing of the expansion valve for suitable connection to the valve member thereof, the arrangement being such that as the temperature of the returning refrigerant falls, the expansion valve will be actuated in a closing direction and a contrary action will obtain as the temperature of the returning refrigerant rises.

The summer operation of the apparatus will now be described. The movement of air through the apparatus is induced by the fan 36 in the manner hereinbefore described and is effected by closing the switch 38. At the same time, the operator also closes the switch 84 and, from the wiring diagram illustrated in Fig. 6, it will be apparent that an inadvertent closing of the switch 84 without a prior closing of the switch 38 will not effect an operation of the refrigerating unit. This relation of the switches has been adopted as a safety measure and in order to prevent operation of the refrigerating unit during the winter season, for example. In describing the summer operation of the machine, it will be assumed that the refrigerating unit has been operating for a sufficient length of time to establish a refrigerating condition in the submerged coil 56 and the dehumidifying coil 59, and also that the water pump has been operating for a time sufficient to secure a thorough soaking of the fabric hoods 29.

The heat exchange relation between the submerged coil 56 and the water in the reservoir 20 is such that the temperature of the water delivered by the water pump to the battery of tanks 28 is of the order of approximately 45 degrees Fahrenheit to 48 degrees Fahrenheit. This temperature, of course, is materially lower than the air temperature of the room during the summer season, so that the air in passing over the soaked hoods loses heat to the water carried by the fabric and undergoes a material drop in temperature, that is, a loss of sensible heat and a corresponding reduction in its dew point. This reduction in temperature may be as much as 10 to 14 degrees Fahrenheit and there may also be some loss of latent heat of the moisture in the air sufficient to cause some condensation of the moisture on the water-soaked hoods, although this condensing or dehumidifying action is more particularly a function of the coil 59. Whether or not any condensation of moisture takes place during the passage of the moisture-laden air over the fabric surfaces, the air will have its temperature reduced by the cooling action of the water-soaked hoods and will be efficiently conditioned by reason of the loss of this sensible heat for the condensation by passage through the dehumidifying coil 59 of that amount of moisture necessary to reduce the relative humidity to a healthful and comfortable point. The coil 59 also further reduces the temperature of the air. Condensate on the coil 59 will flow into the reservoir 20 and the overflow will be discharged through an overflow pipe 86 which is connected to the water outlet pipe 66.

Water returning to the reservoir through the fabric hoods, including impurities washed from the air as above described, also are received by the water in the reservoir, and any excess in moisture will also be discharged through the overflow pipe 86.

Some of the heated water which flows from the fabric hood may lie as a layer on the top of the water in the reservoir 20 and thus will be drained directly down the overflow pipe 86. This action is due to the fact that the temperature of the refrigerant in the submerged coil 56 is of the order of 34 degrees Fahrenheit, while the temperature of the water in the reservoir is always maintained above 39 degrees Fahrenheit as a minimum. Accordingly, by flowing this sensible heat down the drain pipe, certain economies in the operation of the refrigerating unit are accomplished, because it is unnecessary to abstract this heat by direct contact with the submerged coil. Heat which is not thus disposed of will be absorbed from the remaining water in the reservoir by the coil 56 and the cooled water will then be recirculated from the reservoir, then to the fabric hoods and back to the reservoir. As with the humidifying cycle of the apparatus, the cooled and dehumidified air passes into the room between angularly inclined vanes 18 of the outlet grille and is usually directed toward the ceiling of the room. Since this air is colder than those portions of the air that have been in the room for some time, its descent toward the floor of the room will assist in maintaining an imperceptible and normal circulation of air in the room.

The addition of the refrigerating unit, the submerged refrigerating coil 56 and the dehumidifying coil 59 does not disturb the balance of the machine with respect to its capacity to establish and maintain a definite temperature of the air in the room and a lowering of the relative humidity of the air, both with respect to atmospheric conditions as regards these factors. The dehumidifying coil 59 aggregates approximately 28 square feet of cooling surface and this area, in conjunction with the cooling area provided by the surfaces of the fabric hood, the velocity and quantity of air passing though the apparatus and the volumetric content of the room all cooperate to create a temperature and a condition of relative humidity for that particular temperature which is both comfortable and healthful to occupants, having due regard to the number of people in the room and the heat output of electric lamps and similar appliances. The present apparatus is designed to provide for correct temperature reduction and a comfortable state of relative humidity for a space having the cubic contents noted above and a normal heat load such as is represented by approximately 7500 to 8500 B. t. u. per hour. The provision of the safety switch 71 operates to entirely break the electric circuit including the motor 49 in the event that the refrigerant pressure on the high side of the compressor reaches 150 pounds.

The foregoing apparatus is not only highly effective in the conditioning of air with respect to its temperature and relative humidity, but it can also be employed to deodorize, disinfect and scent the air of the room merely by mixing with the water in the reservoir a compound of the desired characteristics.

I claim:

1. Air conditioning apparatus comprising in combination, a plurality of tanks spaced to provide air passages therebetween, each tank being thin relative to the dimension thereof in the direction of air flow and having its opposite sides snugly covered with an absorbent fabric, a reservoir continuously filled with water located beneath the tanks, a drainpipe having its inlet disposed above the bottom of the reservoir to determine the depth of water in the reservoir, a refrigerating device submerged in the reservoir, a casing separate from the reservoir and communicatting with the tanks, a pump for delivering water from the reservoir to the casing and thence to the tanks, each tank having an opening through which water is fed to the fabric covering to maintain the same in a wet condition, and means for passing air over the wet surfaces of the tanks to respectively reduce the dew point of the air, condense a portion of its moisture and to cool the air, the heated water from the tanks returning by gravity to the reservoir and the temperature of the water adjacent the device being lower than that of the heated water whereby a portion of the latter forms a layer on the surface of the water in the reservoir and is discharged directly to the drainpipe.

2. Air conditioning apparatus comprising in combination, a plurality of tanks spaced to provide air passages therebetween, each tank being thin relative to the dimension thereof in the direction of air flow and having its opposite sides snugly covered with an absorbent fabric, a reservoir continuously filled with water located beneath the tanks, a refrigerating device submerged in the reservoir, a casing separate from the reservoir and communicating with the tanks, a pump for delivering water from the reservoir to the casing and thence to the tanks, each tank having an opening through which water is fed to the fabric covering to maintain the same in a wet condition, a de-humidifying element exposed to the air flow and connected to the refrigerating device, the refrigerant being successively passed through the device and element, and means for successively passing the air over the wet surfaces of the tanks and the dehumidifying element to respectively reduce the dew point of the incoming air, condense a portion of its moisture and to cool the air.

JACOB P. NICHOLSON.